(12) United States Patent
Moriyama (10) Patent No.: US 7,856,608 B2
(45) Date of Patent: Dec. 21, 2010

(54) METHOD AND APPARATUS FOR GENERATING CURRENT SOURCE NOISE MODEL FOR CREATING SEMICONDUCTOR DEVICE MODEL USED IN POWER SUPPLY NOISE ANALYSIS

(75) Inventor: Osamu Moriyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 294 days.

(21) Appl. No.: 12/051,364

(22) Filed: Mar. 19, 2008

(65) Prior Publication Data
US 2008/0244478 A1  Oct. 2, 2008

(30) Foreign Application Priority Data
Mar. 30, 2007 (JP) .............................. 2007-091663

(51) Int. Cl.
*G06F 17/50* (2006.01)
(52) U.S. Cl. .................................... 716/4; 716/5; 716/6
(58) Field of Classification Search ............... 716/4–6
See application file for complete search history.

(56) References Cited

U.S. PATENT DOCUMENTS 7,246,335 B2 * 7/2007 Murgai et al. .................. 716/6
2005/0268264 A1  12/2005 Nagai
2008/0052654 A1 * 2/2008 Rahmat et al. ................. 716/6

FOREIGN PATENT DOCUMENTS

JP  A 2004-234618  8/2004
JP  A 2005-339060  12/2005

* cited by examiner

*Primary Examiner*—Naum B Levin
(74) *Attorney, Agent, or Firm*—Greer, Burns & Crain, Ltd

(57) ABSTRACT

A model generation method for generating a semiconductor device model used for power supply noise analysis, is performed by, calculating noise values for various circuit elements based on current source noise waveforms calculated in accordance with a current flowing from a power supply when a state of the elements changes, determining the time when the change of state of the elements causing the current source noise occurs in relation to successive timing windows each having a predetermined time width, and calculating noise by unit time and adding up for each divided unit time the noise value calculated for all elements whose timing window is present in the unit time, wherein a timing determination unit determines the worst case and other noise generation timing based on the noise generated in each unit time.

5 Claims, 12 Drawing Sheets

(1) PEAK VALUE

NOISE VALUE = PEAK VALUE (P)

(2) PEAK VALUE × HALF-VALUE WIDTH

NOISE VALUE = PEAK VALUE (P) × HALF-VALUE WIDTH (T)

(3) INCLINATION

NOISE VALUE = dP/dT

| | TIME UNIT 1 | TIME UNIT 2 | TIME UNIT 3 | TIME UNIT 4 | TIME UNIT 5 |
|---|---|---|---|---|---|
| NOISE 1 | | 10 | 10 | 10 | 10 |
| NOISE 2 | 7 | | | 12 | 12 |
| NOISE 3 | 7 | | | | |
| NOISE 4 | | | 13 | 13 | |
| TOTAL | 7 | 17 | 23 | 35 | 22 |
| | 301 | 302 | 303 | 304 | 305 |

METHOD AND APPARATUS FOR GENERATING CURRENT SOURCE NOISE MODEL FOR CREATING SEMICONDUCTOR DEVICE MODEL USED IN POWER SUPPLY NOISE ANALYSIS

BACKGROUND

The present invention relates to a model generation method and a model generation apparatus of a semiconductor device, and in particular, relates to a model generation method and a model generation apparatus for generating a semiconductor device model used for power supply noise analysis.

When a current flows through a power supply wiring network in a semiconductor device and power is consumed by transistor elements in the device, the power supplied to each transistor element and a ground is subject to a voltage fluctuation. The voltage fluctuation affects characteristics of elements as a voltage noise and also affects yields of semiconductor devices. Particularly with a falling rated supply voltage in recent years, it is becoming more difficult to ignore the voltage fluctuation. Therefore, desired performance cannot always be achieved if the influence by power supply noise is not analyzed with enough precision in the design process. In addition, a problem of reworking and the like due to a redesign may arise. Thus, power supply noise analysis using a high-precision model in the design stage is important.

To perform a high-precision power supply noise analysis, power supply noise analysis simulations of a large-scaled LSI (Large-Scale Integration) using a transistor model such as an SPICE (Simulation Program with Integrated Circuit Emphasis) model can be considered. However, such a large-scale analysis using such a transistor model (without modification) causes a problem of time and resources needed for the analysis and thus, its implementation is not easy.

Thus, a circuit is divided into parts, and then a power supply noise analysis is performed for each part based on the transistor model. A method of performing a power supply noise analysis by dividing a semiconductor device intended for the power supply noise analysis into a power supply line, an internal capacity, an internal consumption current, and an input/output cell, generating an analysis model for each as a sub-model, and creating a model for power supply noise analysis by combining the generated sub-models is also known.

Moreover, a noise analysis performed by modeling signal waveforms in a semiconductor device is known. For example, a method of generating noise waveforms by adding a generation timing window of each type of noise has been proposed to properly calculate noise caused by mutual interference waveforms (crosstalk) regarding crosstalk of signal voltages propagated by signal lines arranged nearby in a semiconductor device.

SUMMARY

According to an aspect of an embodiment, a model generation method for generating a semiconductor device model used for power supply noise analysis, comprises:

calculating a noise value representing a noise amount based on current source noise waveforms by determining the current source noise waveforms calculated in accordance with a current flowing from a power supply when a state of elements, which are arranged in a semiconductor device to be analyzed and cause a change of state leading to noise generation, changes;

acquiring timing when the change of state of the elements causing the current source noise occurs by a static timing analysis as a timing window having a predetermined time width; and calculating noise by unit time by dividing an analysis time in which a transient analysis is performed into unit times and adding up for each divided unit time the noise value calculated for all elements whose timing window is present in the unit time, wherein a timing determination unit determines noise generation timing when the element indicated by the timing window generates a noise based on the noise by unit time by selecting one of the unit times.

Embodiment

According to a conventional method by which sub-models are generated for a semiconductor device intended for power supply noise analysis and these sub-models are combined to create a model for power supply noise, a detailed semiconductor device model can be created for power supply noise analysis. However, behavior of a logical gate with a switching operation has not yet been modeled in detail.

The time of switching of a target transistor can be determined by a static timing analysis as a timing window having some time range. However, since the switching time set for a simulation has no time width, there is a possibility that a case in which switching times of a plurality of transistor elements are overlapped depending on the set time is overlooked. Thus, there may be a possibility that a case in which switching times are overlapped cannot be modeled and, as a result, it has been impossible to perform a power supply noise analysis with high precision.

According to the present embodiment, precision of power supply noise analysis can be improved by enabling modeling of a worst case of generation timing of power supply noise.

Figure 1:
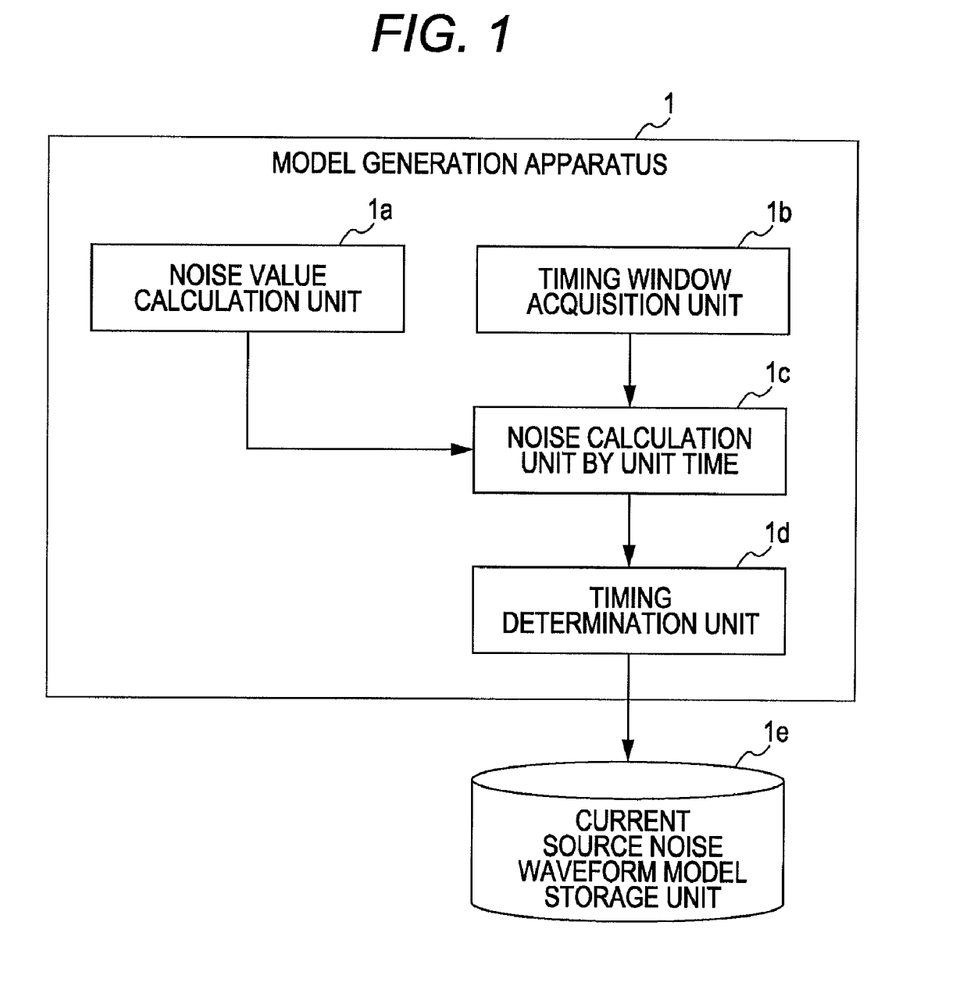
FIG. 1 is a diagram of a model generation apparatus applied in an embodiment.

FIG. 1 is a conceptual diagram of a model generation apparatus applied in the present embodiment.

A model generation apparatus 1 applied in the present embodiment has noise value calculation unit 1a, timing window acquisition unit 1b, noise calculation unit by unit time 1c, timing determination unit 1d, and current source noise waveform model storage unit 1e and generates a semiconductor device model or a current source noise waveform model used for power supply noise analysis of a semiconductor device to be analyzed.

The noise value calculation unit 1a calculates a noise value when a state of an element constituting a semiconductor device to be analyzed changes. When the state of an element changes due to, for example, a switching operation of the element, a current source noise is generated in accordance with a current flowing into the element from the power supply. The noise value calculation unit 1a calculates waveforms of the current source noise from operation characteristics of the target element, capacitive load connected to output and the like. Then, the noise value calculation unit 1a calculates a noise value representing the noise amount of the current source noise based on the current source noise waveforms. As the noise value, for example, a peak value of noise waveforms, a peak value of noise waveforms and a time width of waveforms, or an inclination of waveforms is selected.

The calculated noise value is stored in an internal storage apparatus. The timing window acquisition unit 1b acquires timing when a change of state of an element causing a current source noise occurs, that is, a time zone when a current source noise could be caused by a current flowing into an element as a timing window. The timing window indicates a time zone that could cause a change of state and has some time width.

The noise calculation unit by unit time 1c divides an analysis time in which a transient analysis is performed into a predetermined number of divisions N (N is an arbitrary integer). Each divided time is called a unit time. Then, a noise by unit time is calculated by adding up the noise value calculated by the noise value calculation unit 1a of all elements whose timing window is present in the unit time. The noise by unit time is stored in the internal storage apparatus.

The timing determination unit 1d determines timing when a change of state of an element represented by a timing window should be caused based on noise by unit time by selecting one of a plurality of unit times in which the timing window is present. More specifically, the timing determination unit 1d selects a unit time in which timing windows of a plurality of elements are overlapped by comparing noise values in each unit time based on noise by unit time. If, for example, a unit time in which the noise value takes the largest value is defined as the worst case, the unit time is selected as the generation timing for an element that has a timing window in the worst case. If there is any element whose timing has not been determined, the same processing is performed for the unit time whose noise value is the second largest to determine generation timing of the element that has a timing window in this unit time. If the timing is determined in the previous step, the determination is prioritized. The processing is repeated in this manner until timing is determined for all elements.

An operation and a model generation method of the model generation apparatus 1 having a configuration described above will be described.

The noise value calculation unit 1a calculates a noise value when the state of an element constituting a semiconductor device to be analyzed changes based on current source noise waveforms. The noise value is calculated, for example, from a peak value of noise waveforms, a product of a peak value of noise waveforms and a time width of noise waveforms, or an inclination of noise waveforms. The noise value may be suitably selected in accordance with characteristics of a semiconductor device or the like. The timing window acquisition unit 1b, on the other hand, acquires a timing window for each element based on a static timing analysis.

Figure 2:
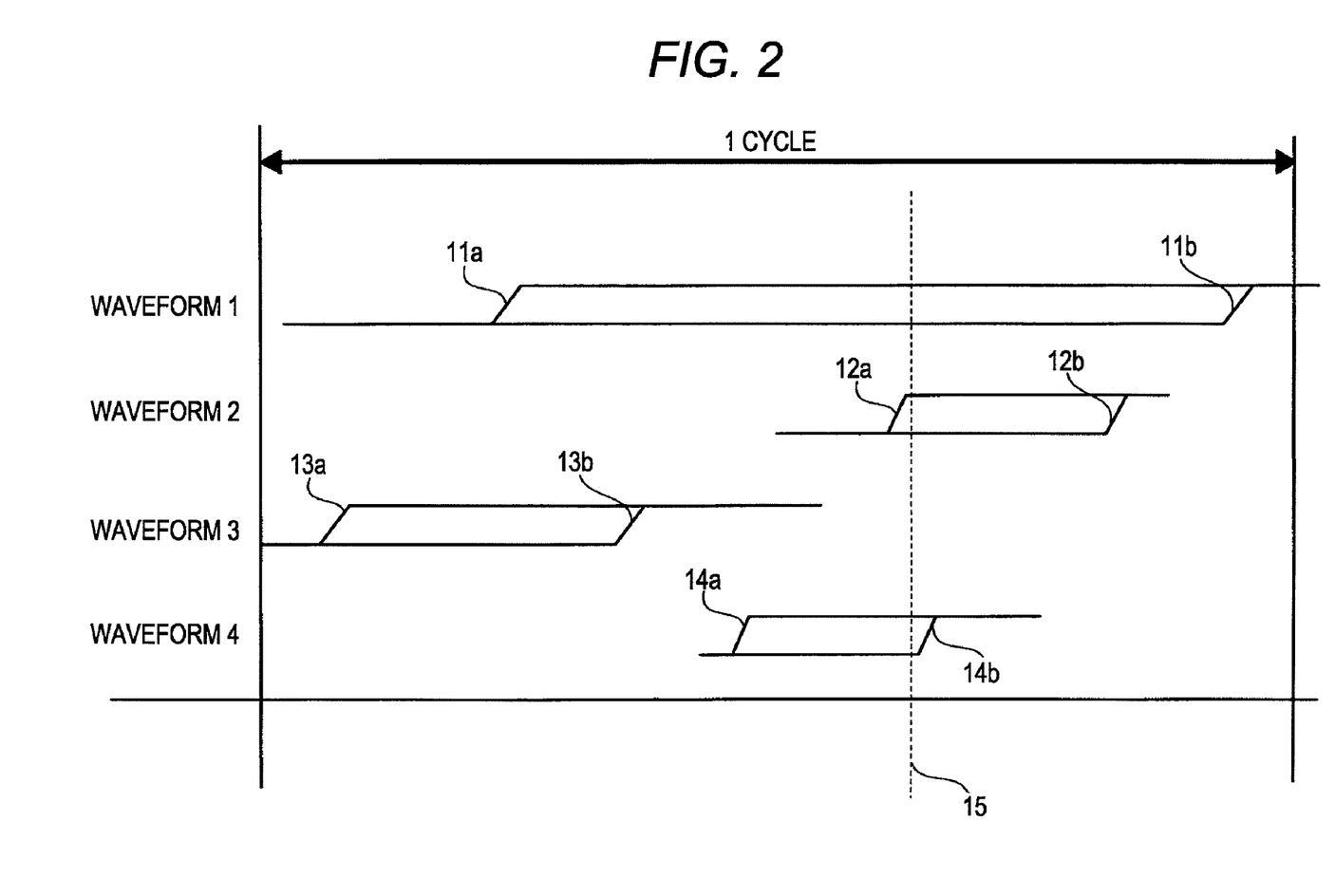
FIG. 2 is a diagram exemplifying timing windows acquired based on a static timing analysis.

Here, the timing window will be described. FIG. 2 is a diagram exemplifying timing windows acquired based on a static timing analysis.

The example in the figure is a waveform diagram showing timing windows of each element obtained by performing a static timing analysis of elements 1, 2, 3, and 4 causing a change of state leading to generation of noise. The horizontal axis in the figure is an elapsed time and shows operation waveforms of each element during one cycle.

A waveform 1 showing a change of state of the element 1 is a timing window of the element 1 represented by a minimum value (the earliest operating time) 11a and a maximum value (the latest operating time) 11b. A waveform 2 showing a change of state of the element 2 is a timing window of the element 2 represented by a minimum value 12a and a maximum value 12b. A waveform 3 showing a change of state of the element 3 is a timing window of the element 3 represented by a minimum value 13a and a maximum value 13b. A waveform 4 showing a change of state of the element 4 is a timing window of the element 4 represented by a minimum value 14a and a maximum value 14b. Each element causes the state to change in any timing within the timing window to generate a noise of a predetermined noise value for each. The timing when the state of each element changes may be simultaneous or different.

Here, the worst case is considered. The worst case will be a case in which the elements 1, 2, and 4 operate near timing 15 when the timing window waveform 1 of the element 1, the timing window waveform 2 of the element 2, and the timing window waveform 4 of the element 4 overlap. The noise amount generated here can be considered by rough estimate to be the total of the noise value generated by each of the elements 1, 2, and 4. However, if timing of the state change of each element is simply set as the minimum values 11a, 12a, and 14a, the maximum values 11b, 12b, and 14b or mean values of the timing window while performing a simulation, the timing 15 of the worst case will be overlooked.

Thus, the noise calculation unit by unit time 1c divides one cycle into unit times and calculates a noise value of the worst case for each unit time. The unit time can arbitrarily be set, but it is desirable to select a time shorter than a timing window of the minimum time width. The worst case for each unit time is a case in which operations of all elements whose timing window is present in the unit time are overlapped and the noise amount in that case is calculated roughly as the total of the noise amount of each element. The noise calculation unit by unit time 1c extracts for each unit time elements whose timing window is present in the unit time and adds a noise value calculated by the noise value calculation unit 1a for each of the extracted elements to calculate the total value. The total value will be a noise by unit time.

Then, the timing determination unit 1d refers to the noise by unit time to determine timing when a change of state of an element represented by a timing window is caused by selecting one of a plurality of unit times in which the timing window is present. In the example shown in FIG. 2, for example, the noise by unit time of the unit time including the timing 15 will be at the maximum. Therefore, operating timings of the elements 1, 2, and 4 whose timing window is present in this unit time are determined for the unit time. The determined timing is stored in the current source noise waveform model storage unit 1e together with other information needed for modeling.

With the above processing procedure being performed, a change of state of each element occurs in the timing determined by the timing determination unit 1d during a simulation. Accordingly, a worst-case simulation is performed for a power supply noise waveform model. Since an influence of power supply noise is the greatest in the worst case, it is sufficient to check the influence of power supply noise in the worst case. Since the worst case will not be overlooked according to the present embodiment, a power supply noise analysis model with high precision in this respect can be provided.

An embodiment will be described in detail below by taking a case in which sub-models are created for a semiconductor device intended for power supply noise analysis and a power supply noise model is created by combining these sub-models before the model is applied for a power supply noise analysis apparatus for analyzing power supply noise as an example with reference to drawings.

Figure 3:
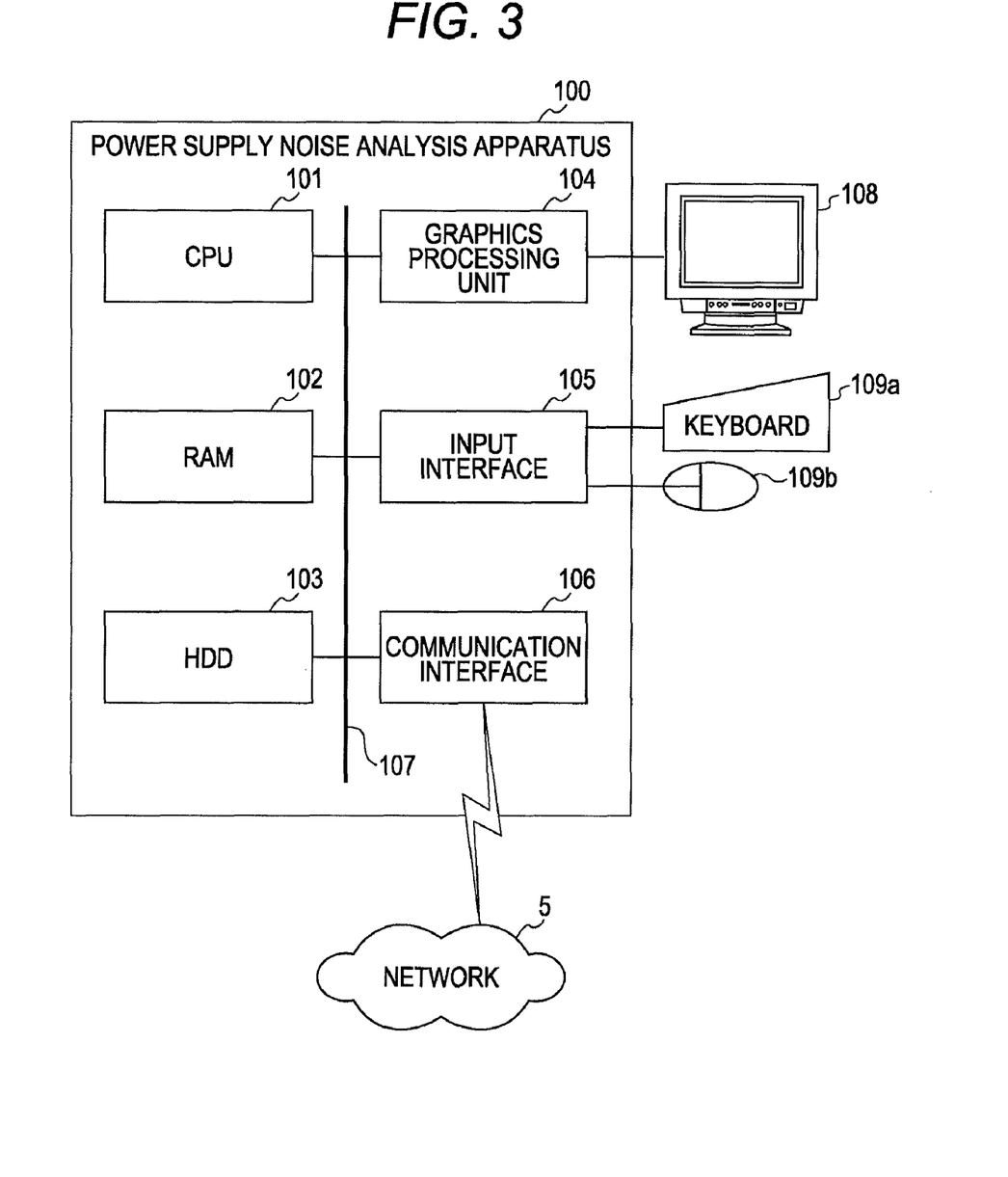
FIG. 3 is a block diagram showing a hardware configuration example of a power supply noise analysis apparatus in the present embodiment.

FIG. 3 is a block diagram showing a hardware configuration example of a power supply noise analysis apparatus in the present embodiment.

The entire operation of a power supply noise analysis apparatus 100 is controlled by a CPU (Central Processing Unit) 101. A RAM (Random Access Memory) 102, a hard disc drive (HDD) 103, a graphic processing unit 104, an input interface 105, and a communication interface 106 are connected to the CPU 101 via a bus 107.

At least a portion of programs of an OS (Operating System) and application programs, which the CPU 101 is caused to execute, is temporarily stored in the RAM 102. Also, various kinds of data required for processing by the CPU 101 are stored in the RAM 102. In the HDD 103, OS and application programs are stored. A monitor 108 is connected to the graphic processing unit 104 and images are made to be displayed in a screen of the monitor 108 according to instructions from the CPU 101. A keyboard 109a and a mouse 109b are connected to the input interface 105 to send signals sent from the keyboard 109a and mouse 109b to the CPU 101 via the bus 107. The communication interface 106 is connected to a network 5 to exchange data with terminal units via the network 5.

With a hardware configuration described above, processing functions in the present embodiment can be realized.

Figure 4:
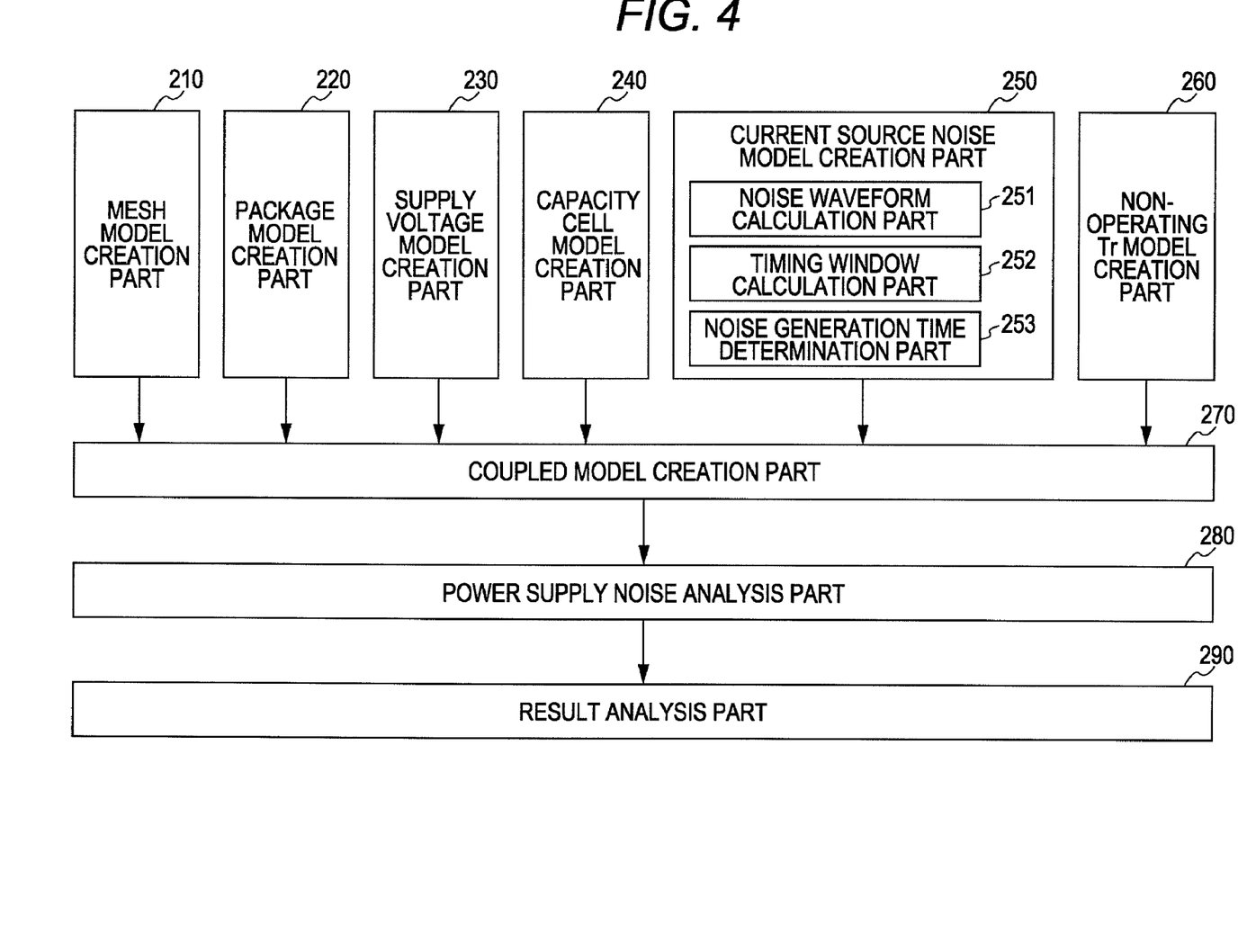
FIG. 4 is a diagram exemplifying a software configuration of the power supply noise analysis apparatus in the present embodiment.

Next, functions of the power supply noise analysis apparatus 100 in the present embodiment will be described. FIG. 4 is a diagram exemplifying a functional block diagram of the power supply noise analysis apparatus in the present embodiment. These functions can be realized by causing software to operate on a computer.

The power supply noise analysis apparatus 100 in the present embodiment has a mesh model creation part 210, a package model creation part 220, a supply voltage model creation part 230, a capacity cell model creation part 240, a current source noise model creation part 250, a non-operating transistor (Tr) model creation part 260, a coupled model creation part 270, a power supply noise analysis part 280, and a result analysis part 290.

The mesh model creation part 210 extracts power supply wiring from the target semiconductor device and then models the wiring network using resistance elements and capacitative elements (hereinafter referred to as RC), or resistance elements, inductance elements, and capacitative elements (hereinafter referred to as RLC). A created mesh model is output to the coupled model creation part 270.

The package model creation part 220 models a power supply terminal and a package of a semiconductor device using RC or RLC. A created package model is output to the coupled model creation part 270.

The supply voltage model creation part 230 models a voltage source supplied to a power supply terminal of a semiconductor device. A created supply voltage model is output to the coupled model creation part 270.

The capacity cell model creation part 240 is arranged in a semiconductor device and models a capacity cell for removing noise connected to a power supply line having a capacitive output circuit. A created capacity cell model is output to the coupled model creation part 270.

The current source noise model creation part 250 models a logical gate in a state of signal changing operation leading to noise generation among logical gates arranged in a semiconductor device to constitute logic using a current source. Hereinafter, it is assumed that the signal changing operation leading to noise generation is a switching operation. The current source noise model creation part 250 has a noise waveform calculation part 251, a timing window calculation part 252, and a noise generation time determination part 253. The noise waveform calculation part 251 calculates current source noise waveforms generated by a switching operation of a logical gate performing a switching operation. The timing window calculation part 252 calculates a timing window showing a time when an output signal changes due to a switching operation of each logical gate. Since noise is generated by a current flowing from the power supply caused by a switching operation of the logical gate, the timing window can be considered to represent a time zone in which noise generating timing could occur. As described above, the timing window has a predetermined time range. The noise generation time determination part 253 determines timing when the logical gate performs a switching operation, that is, noise generation timing according to the model creation method shown in FIG. 1 based on the timing window and current source noise waveforms. Then, the noise generation time determination part 253 creates a current source noise model that causes a current source noise according to the determined noise generation timing. A created current source noise model is output to the coupled model creation part 270.

The non-operating Tr model creation part 260 models a non-operating logical gate causing no power supply noise (with a constant signal) among logical gates arranged in a semiconductor device to constitute logic using a resistive-capacitive output circuit. A created non-operating Tr model is output to the coupled model creation part 270.

The coupled model creation part 270 creates a semiconductor device model for power supply noise analysis that can analyze a semiconductor device intended for power supply noise analysis using a circuit simulator by combining the mesh model, package model, supply voltage model, capacity cell model, current source noise model, and non-operating Tr model created by the mesh model creation part 210, the package model creation part 220, the supply voltage model creation part 230, the capacity cell model creation part 240, the current source noise model creation part 250, and the non-operating transistor (Tr) model creation part 260 respectively. A created semiconductor device model is output to the power supply noise analysis part 280.

The power supply noise analysis part 280 causes a circuit simulator to operate the semiconductor device model created by the coupled model creation part 270 to analyze an influence of power supply noise on the semiconductor device.

The result analysis part 290 further evaluates an analysis result of the power supply noise analysis part 280.

The power supply noise analysis apparatus 100 in the present embodiment creates detailed sub-models of a target semiconductor device and then combines these sub-models to create a semiconductor device model, as described above, and therefore, an influence of power supply noise of the target semiconductor device can be analyzed with high precision.

Generally known processing procedures are performed for the mesh model creation part 210, the package model creation part 220, the supply voltage model creation part 230, the capacity cell model creation part 240, the non-operating transistor (Tr) model creation part 260, the coupled model creation part 270, the power supply noise analysis part 280, and the result analysis part 290. A detailed processing procedure for the current source noise model creation part 250 will be described below using a concrete example.

Figure 5:
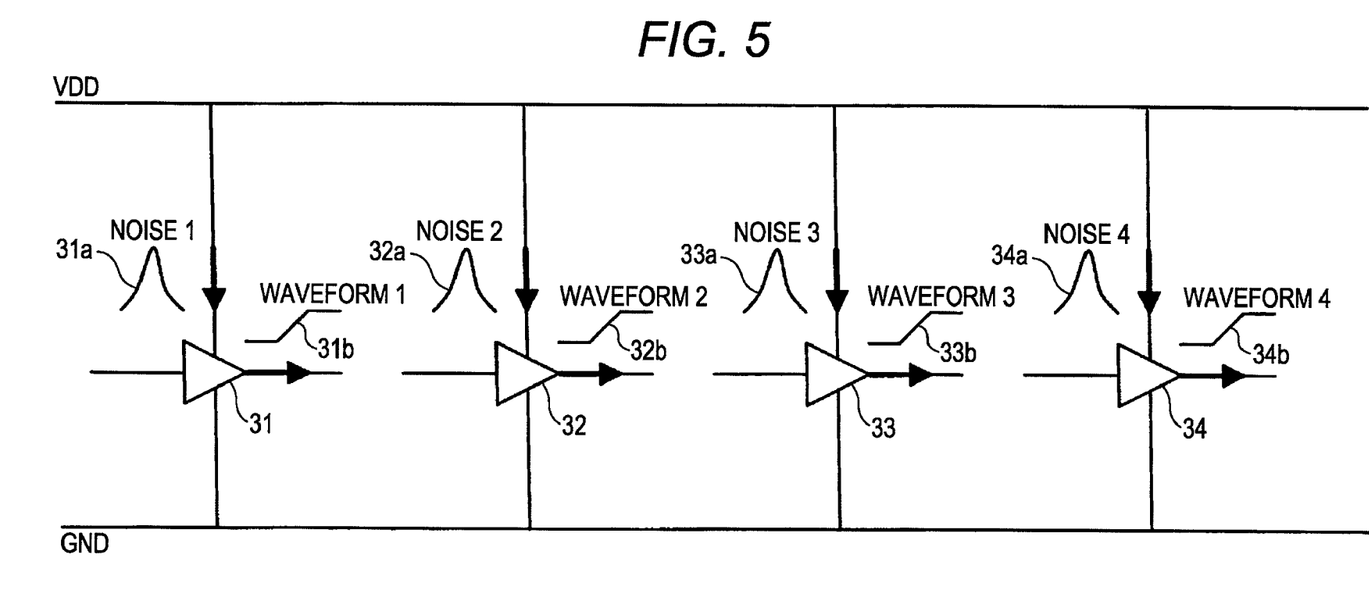
FIG. 5 is a circuit diagram exemplifying a semiconductor device to be analyzed by the present embodiment.

FIG. 5 is a circuit diagram exemplifying a semiconductor device to be analyzed by the present embodiment.

To be modeled for power supply noise analysis by the current source noise model creation part 250 of the power supply noise analysis apparatus 100 in the present embodiment is a circuit comprising four buffers 31, 32, 33, and 34. An output signal from the buffer 31 is switched to change from low to high as shown by waveform 1 (31*b*). At this time, a current flow is initiated from the power supply VDD to the buffer 31 to generate a noise. A noise 1 (31*a*) of the current depends on switching waveforms of the buffer 31 and capacitive load connected to the output. Similarly, an output signal from the buffer 32 is switched and the output signal changes like waveform 2 (32*b*). At this time, a noise 2 (32*a*) is input. Similarly, an output signal from the buffer 33 is switched and the output signal changes like waveform 3 (33*b*). At this time, a noise 3 (33*a*) is input. Similarly, an output signal from the buffer 34 is switched and the output signal changes like waveform 4 (34*b*). At this time, a noise 4 (34*a*) is input. Like the buffer 31, noise waveforms of each of the buffers 32, 33, and 34 depend on switching waveforms of the buffer and capacitive load connected to output.

Figure 6:
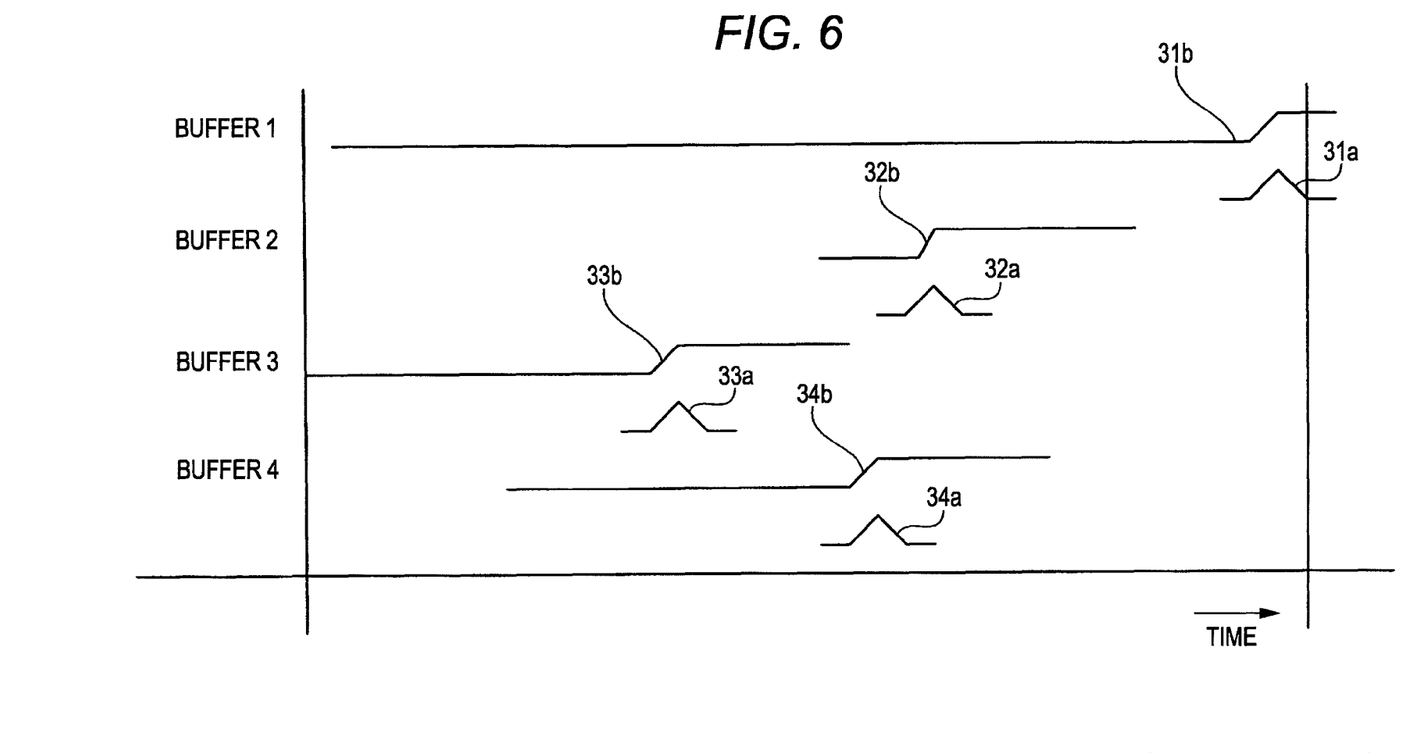
FIG. 6 is a diagram showing switching waveforms and noise waveforms of a buffer of the semiconductor device to be analyzed by the present embodiment.

FIG. 6 is a diagram showing switching waveforms and noise waveforms of a buffer of the semiconductor device to be analyzed by the present embodiment. The same numbers are attached to the same objects as those in FIG. 5 and a description thereof is omitted. The horizontal direction in the figure is a time axis.

When a buffer 1 performs a switching operation with the switching timing 31*b*, the noise 31*a* is generated. When a buffer 2 performs a switching operation with the switching timing 32*b*, the noise 32*a* is generated. When a buffer 3 performs a switching operation with the switching timing 33*b*, the noise 33*a* is generated. When a buffer 4 performs a switching operation with the switching timing 34*b*, the noise 34*a* is generated.

The noise waveform calculation part 251 calculates waveforms of each buffer. Waveforms of noise are not uniform and various forms can be supposed. Thus, in noise value calculation processing, the calculation method of a noise value is suitably selected in accordance with noise forms. Next, the calculation method of a noise value will be described by showing some examples.

Figure 7:
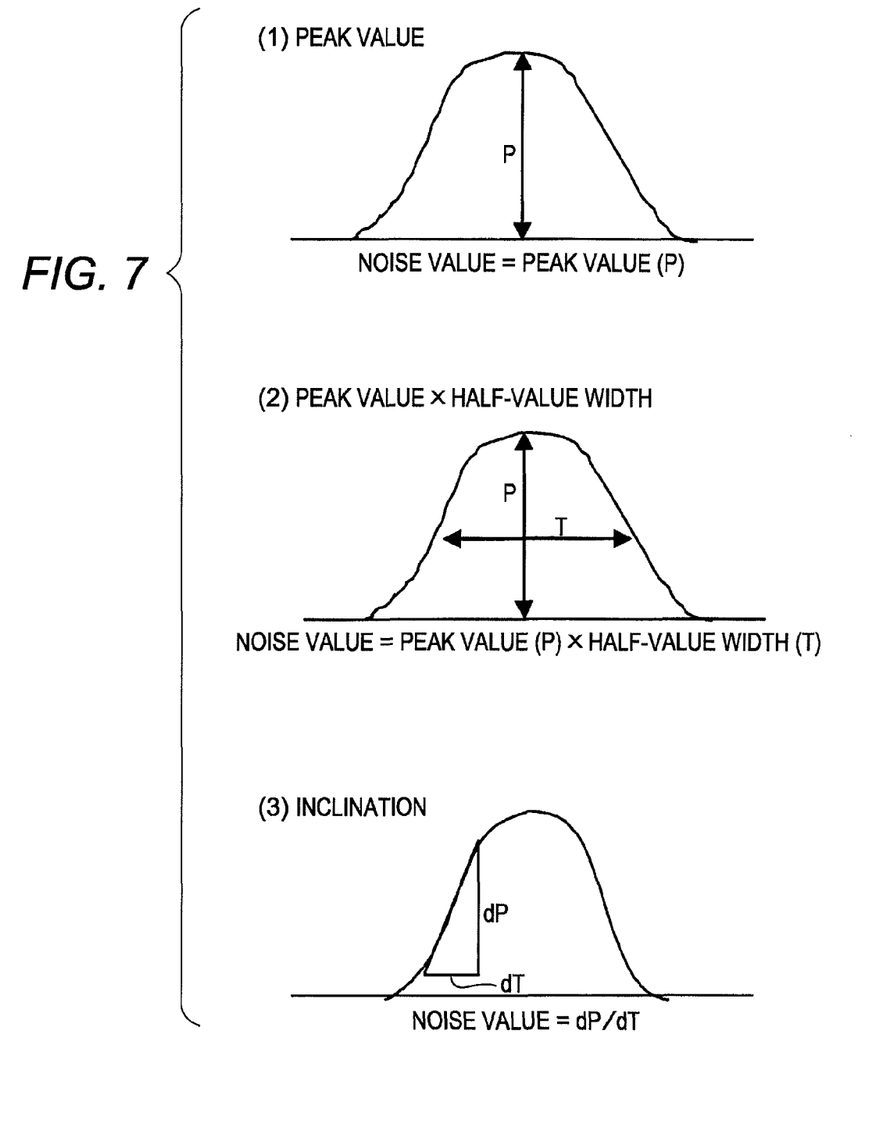
FIG. 7 is a diagram showing some examples of noise value calculation methods in the present embodiment.

FIG. 7 is a diagram showing some examples of noise value calculation methods in the present embodiment. (1) shows an example of calculating a noise value from a peak value. (2) shows an example of calculating a noise value from a peak value and a half-value width. (3) shows an example of calculating an inclination of noise waveforms as a noise value.

(1) Peak value: The peak value (P) of the maximum noise waveform is selected as the noise value.

(2) Peak value×half-value width: A product of the peak value (P) and half-value width (T) is selected as the noise value. The half-value width is a width linking a point in time when a half value of the peak value is reached from 0 and a point in time when the half value is reached from the peak value.

(3) Inclination: An amount of change in the noise value in a predetermined time unit. This value is calculated by the amount of change of the peak value (dP)/change in time (dT).

In a description that follows, noise values of noise waveforms shown in FIG. 6 are assumed as follows: noise 1 (31*a*) =10, noise 2 (32*a*)=12, noise 3 (33*a*)=7, noise 4 (34*a*)=13.

The timing window calculation part 252, on the other hand, calculates a timing window of each buffer. Subsequently, the noise generation time determination part 253 divides one cycle into N (N is an arbitrary integer) parts to associate these N parts with timing windows. Hereinafter, one divided unit time is called a time unit.

Figure 8:
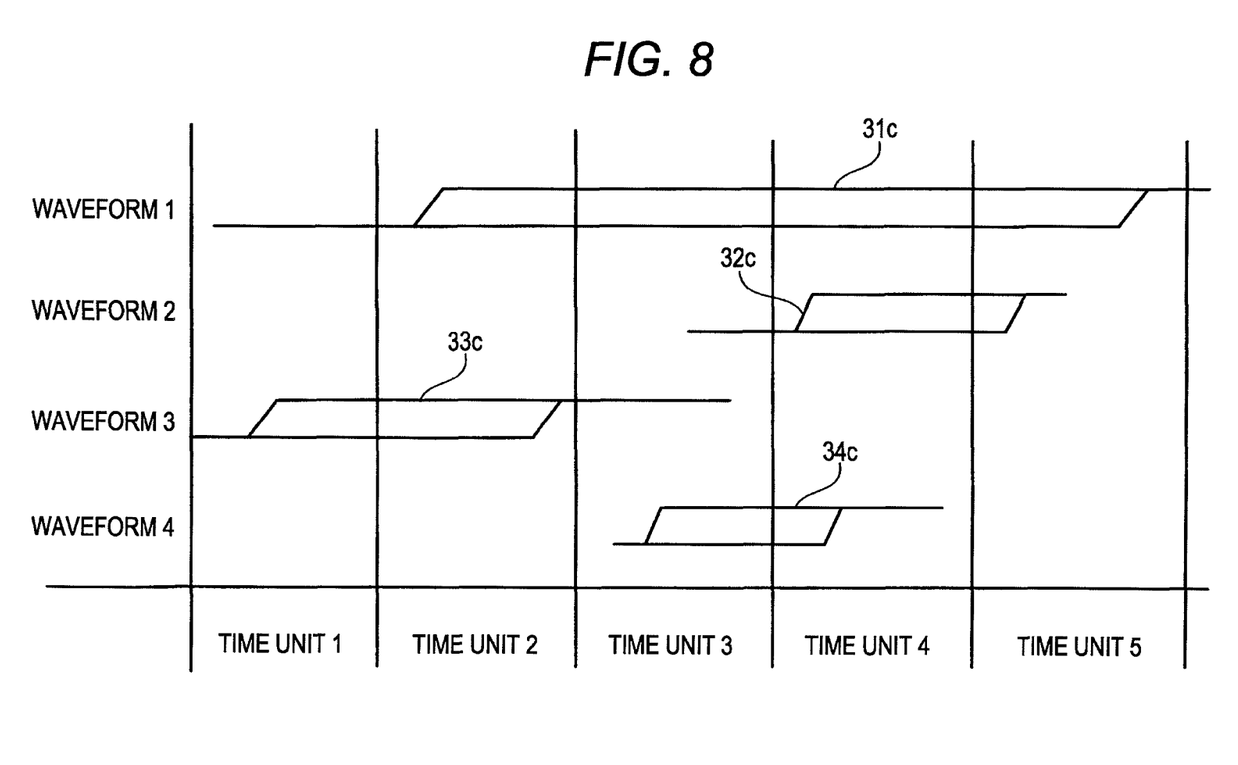
FIG. 8 is a diagram showing timing windows and time units in the present embodiment by overlapping them.

FIG. 8 is a diagram showing timing windows and time units in the present embodiment by overlapping them.

In the example shown in the figure, one cycle is divided into five parts, with each part called a time unit 1, a time unit 2, a time unit 3, a time unit 4, and a time unit 5.

In the example shown in the figure, a timing window 31*c* of the buffer 1 (31) starts in the time unit 2 and ends in the time unit 5. That is, the buffer 1 (31) performs a switching operation between the time unit 2 and time unit 5. A timing window 32*c* of the buffer 2 (32) starts in the time unit 4 and ends in the time unit 5. A timing window 33*c* of the buffer 3 (33) starts in the time unit 1 and ends in the time unit 1. A timing window 34*c* of the buffer 4 (34) starts in the time unit 3 and ends in the time unit 4.

The noise generation time determination part 253 determines in which time unit a noise (switching operation of a buffer) could occur. Then, the noise generation time determination part 253 calculates the maximum noise value by adding up the noise value of each buffer for time units in which a timing window is present, that is, for time units in which a noise could be generated. For example, the time unit 1 has only the timing window 33*c* of the buffer 3 (33). Therefore, the noise value of the time unit 1 will be the noise value 7 of the buffer 3 (33). The time unit 2 has the timing window 33*c* of the buffer 3 (33) and the timing window 31*c* of the buffer 1 (31). Therefore, the noise value of the time unit 2 will be 17, which is the total of the noise value 7 of the buffer 3 (33) and the noise value 10 of the buffer 1 (31). Hereafter, the noise generation time determination part 253 will calculate a total value for each time unit 1n the same manner.

Figure 9:
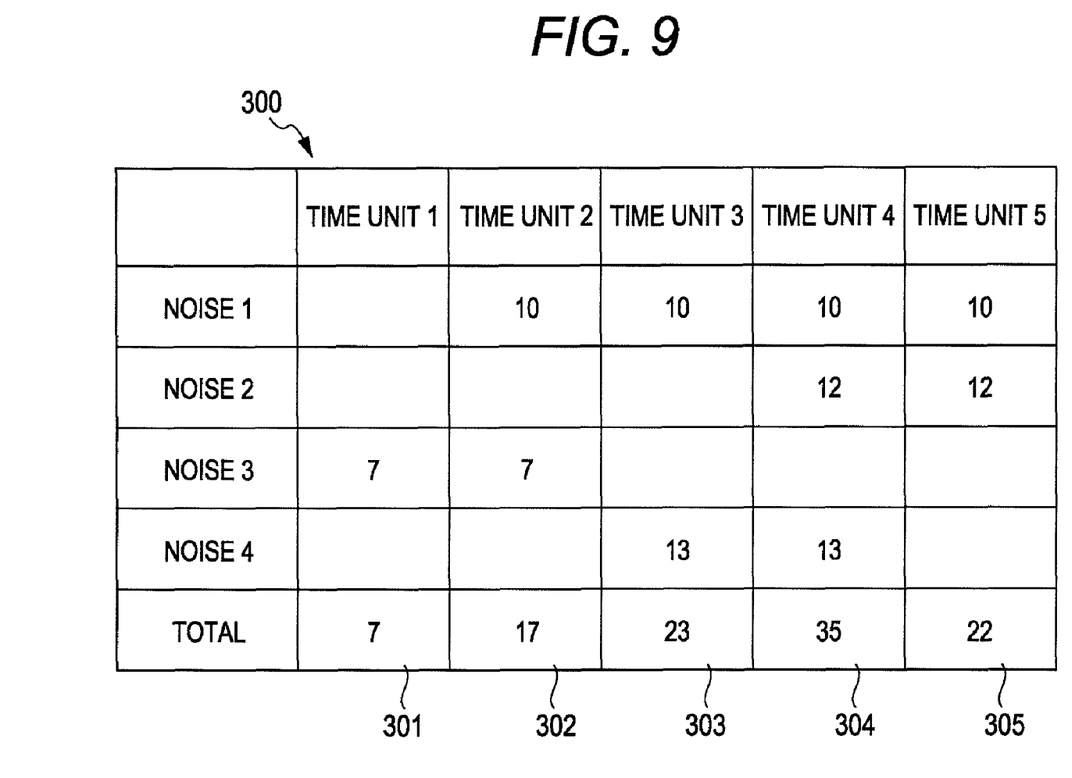
FIG. 9 is a diagram showing a calculation result of a noise value table for each time unit in the present embodiment.

FIG. 9 is a diagram showing a calculation result of a noise value table for each time unit 1n the present embodiment.

In a noise value table 300 for each time unit, a list of noises that could be generated in each time unit and total values thereof are set. The noise 1 indicates that it is a noise caused by the buffer 1. The same applies to the noise 2, noise 3, and noise 4. The noise 3 of the buffer 3 is generated in the time unit 1 (301) and the total of the noise value is 7. The noise 1 of the buffer 1 and the noise 3 of the buffer 3 are generated in the time unit 2 (302) and the total of the noise value is 17. The noise 1 of the buffer 1 and the noise 4 of the buffer 4 are generated in the time unit 3 (303) and the total of the noise value is 23. The noise 1 of the buffer 1, the noise 2 of the buffer 2, the noise 4 of the buffer 4 are generated in the time unit 4 (304) and the total of the noise value is 35. The noise 1 of the buffer 1 and the noise 2 of the buffer 2 are generated in the time unit 5 (305) and the total of the noise value is 22.

Based on the table 300, the noise generation time determination part 253 determines the generation time of the worst case noise. It is evident from the table 300 that the maximum noise is generated in the time unit 4. Thus, the noise generation time determination part 253 selects the time unit 4 as the worst case and determines the time unit 4 as generation timing for the noise 1, noise 2, and noise 4. The time unit having the second highest noise value is the time unit 3. Since generation timing is already set to the noise 1 and noise 4, which could be generated in this time unit, in the time unit 4, no generation timing is set in the time unit 3. Likewise, no generation timing is set in the time unit 5 having the third highest noise value. Subsequently, the noise generation time determination part 253 selects the noise value of the time unit 2 as the worst case and determines generation timing for the noise 3 in the time unit 2. Since generation timing is already determined for the noise 1, no further setting is made. The noise generation time determination part 253 determines generation timing of noise in descending order of noise value in this manner. Thus, the worst case is reliably modeled.

Figure 10:
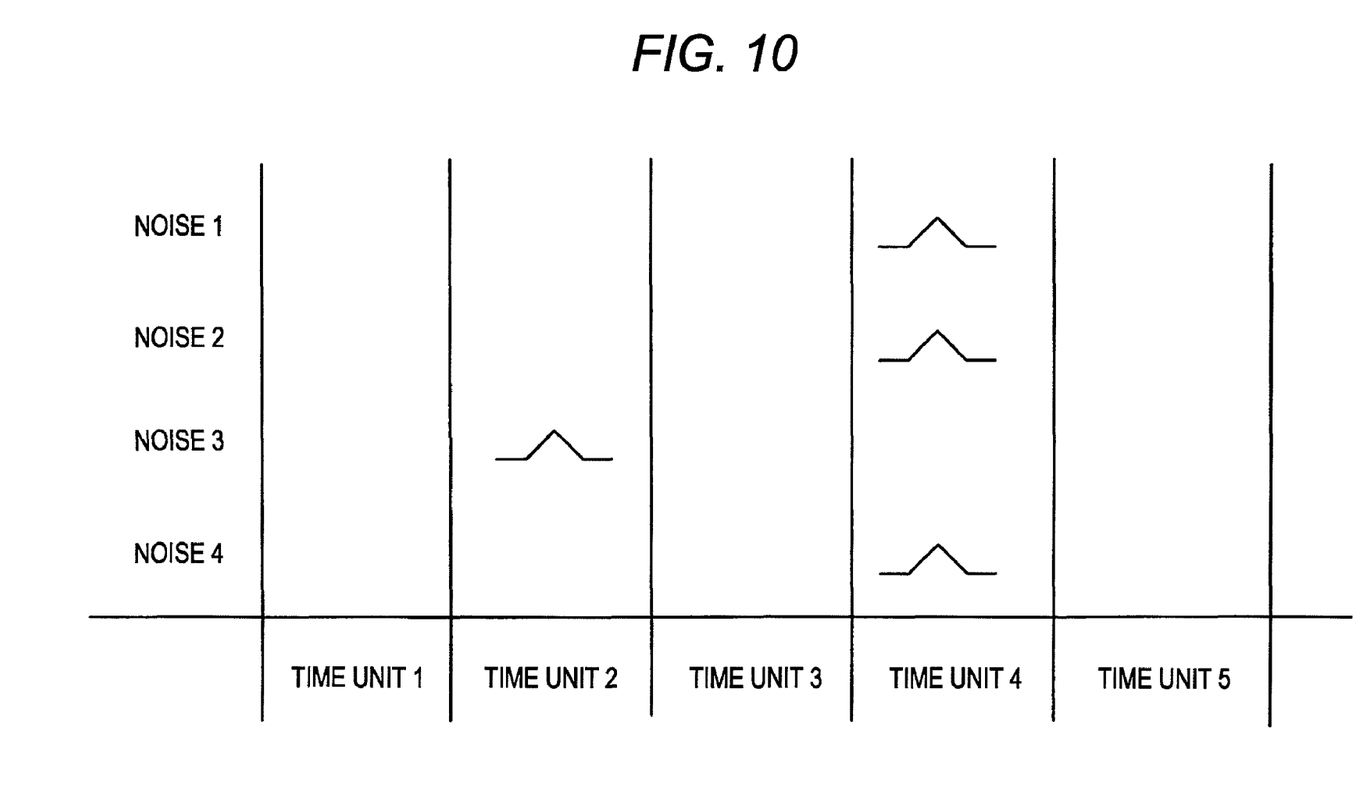
FIG. 10 is a diagram showing generation timing of a power supply noise model determined by the present embodiment.

FIG. 10 is a diagram showing generation timing of a power supply noise model determined by the present embodiment.

As determined by the above processing procedure, the worst case in which a noise waveform 1 of the buffer 1, a noise waveform 2 of the buffer 2, and a noise waveform 4 of the buffer 4 are overlapped. In addition, generation timing for a waveform 3 of the buffer 3 is set in the time unit 2.

With the above processing procedure being performed, the worst case of generation timing of power supply noise can be efficiently modeled as current waveforms of power supply. As a result, precision with which a power supply noise analysis is performed using the model can be improved.

In the above processing procedure, considering overlapping of current source noise waveforms of logical gates spatially apart within a semiconductor device leads to calculation of an excessive worst case. This is because it is unlikely that logical gates spatially apart are mutually affected by generated noise. Therefore, the model generation apparatus can divide an internal space of a semiconductor device into a plurality of areas to perform the above processing procedure for each divided area. Particularly for a large-scale semiconductor device, it is realistic to divide an internal space of the semiconductor device.

Figure 11:
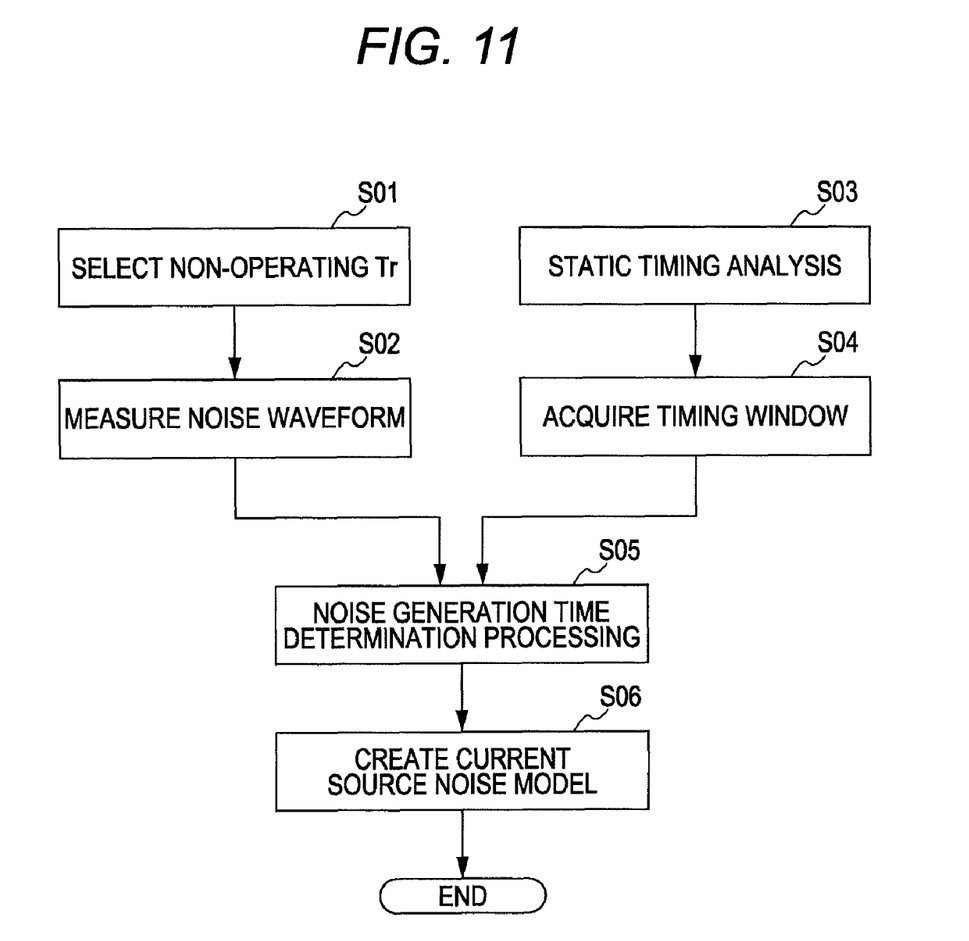
FIG. 11 is a flow chart showing a procedure for current source noise model creation processing in the present embodiment.

Next, a processing procedure for current source noise model creation processing in the present embodiment will be described. FIG. 11 is a flow chart showing a procedure for current source noise model creation processing in the present embodiment.

The current source noise model creation part 250 is activated together with relevant other model creation parts to perform processing shown below:

[Step S01] Select an operating transistor (Tr) performing a switching operation to analyze noise generated in accordance with the switching operation. Then, acquire information about the selected transistor (Tr) needed for calculating noise waveforms.

[Step S02] Calculate current source noise waveforms based on the information acquired in step S01 and measure the noise value thereof. Calculate, for example, a peak value of the current source noise waveforms, a peak value and a half-value width of the peak value, or an inclination of the current source noise waveforms as the noise value. After calculating the noise value, proceed to step S05.

[Step S03] Perform a static timing analysis to analyze behavior of logical gates.

[Step S04] Acquire timing windows in which logical gates cause noise based on an analysis result in step S03.

[Step S05] Determine noise generation times based on noise waveforms measured in steps S01 and S02 and timing windows acquired in steps S03 and S04. Details of the processing will be described later and generation timing of a worst case in which noise generation of a plurality of logical gates is overlapped is determined by noise generation time determination processing as the noise generation time.

[Step S06] A current source noise model is created for the noise generation time determined in step S05.

With the above processing procedure being performed, the worst case in which a plurality of logical gates causes noise at the same time can be modeled. Processing of steps S01 and S02 or that of steps S03 and S04 may be performed first. Or, they can be performed simultaneously.

Figure 12:
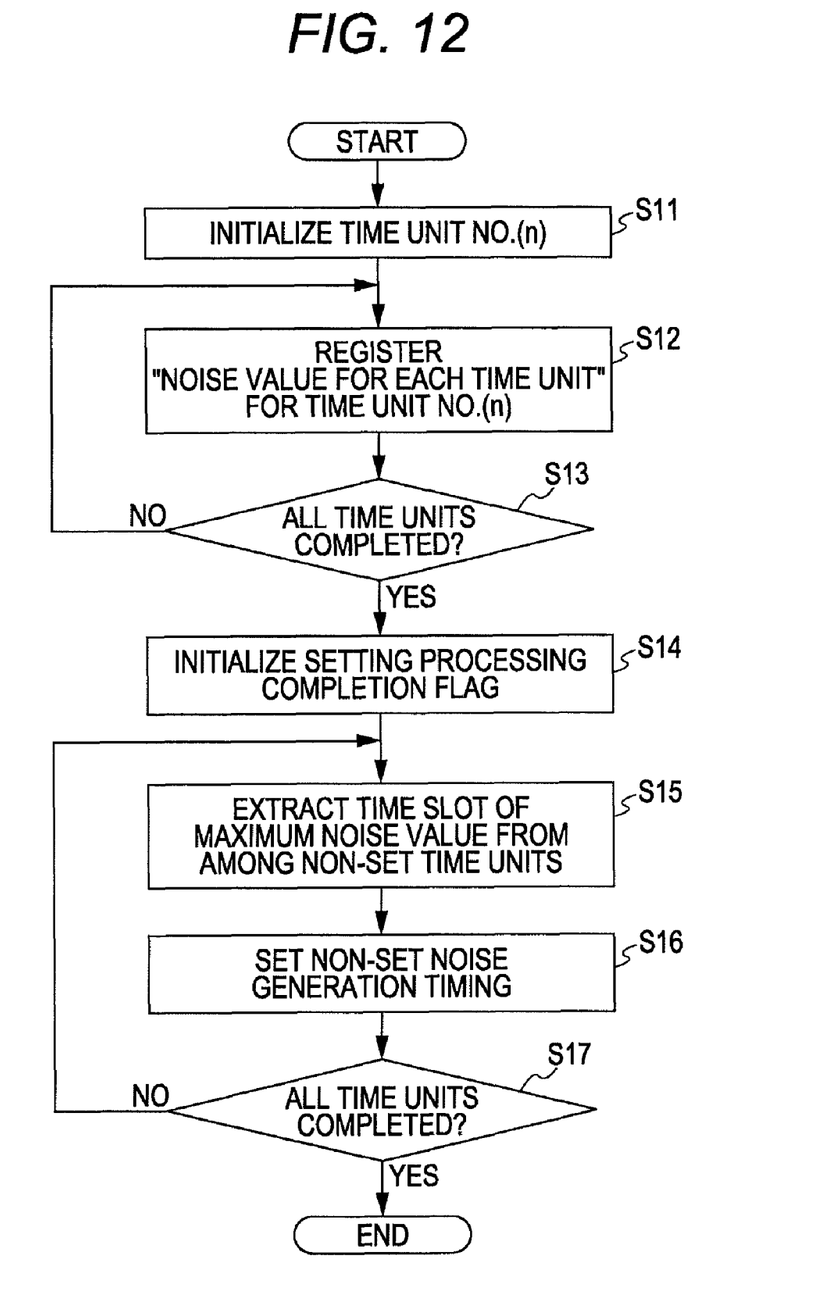
FIG. 12 is a flow chart showing a processing procedure for determining a noise generation time in the present embodiment.

Subsequently, determination processing of a noise generation time will be described. FIG. 12 is a flow chart showing a processing procedure for determining a noise generation time in the present embodiment.

In step S05 in FIG. 11, the noise generation time determination part 253 is activated to perform processing shown below:

[Step S11] Perform processing for each time unit obtained by dividing one cycle of the analysis object. First, initialize the time unit No. n (n is an arbitrary integer having the number of divisions as the maximum value) identifying a target time unit.

[Step S12] Calculate for the specified time unit No. n the maximum noise value to be a worst case for the timing unit by adding up all noise values generated in timing windows in the relevant time unit. Register the calculated noise value in a corresponding field of the noise value table 300 for each unit. In the noise value table 300, for each time unit, types of noise that could be generated in the time unit and the magnitude thereof are registered together with the total value of all noise.

[Step S13] Determine whether processing for all time units has been completed. If completed, proceed to step S14 to perform the next process. If not completed, return to step S12 to perform processing for the next time unit.

With the above processing procedure, the noise value table 300 for each time unit 1s set. Subsequently, timing determination processing is performed.

[Step S14] Initialize the setting processing complete flag associated with each time unit. If the setting processing complete flag is 1, the noise generation time has been determined based on the relevant time unit. Incidentally, the setting processing complete flag corresponding to a time slot in which no noise is generated (the total of the noise values is 0) may be set to 1 at the time of initialization. Unnecessary processing can thereby be eliminated.

[Step S15] Compare the total noise values of non-set time slots to extract a time slot having the maximum noise value.

[Step S16] Set noise generation timing to this time slot for logical gates whose noise generation timing has not been set among logical gates whose timing window is present in the time slot extracted in step S15. Set the setting processing complete flag of the relevant time slot to 1.

[Step S17] Determine whether processing for all time units has been completed. If not completed, return processing to step S15 to repeat noise generation timing determination processing. If completed, terminate processing. With the above processing procedure being performed, timing of a worst case in which noise generation timings of a plurality of logical gates are overlapped can be determined. The above processing procedure is only an example and the present invention is not limited by the above example. For example, the time slot with the maximum noise value can be determined for each logical gate.

Each processing function described above can be realized by a computer. In that case, a program that describes processing content of functions that should be held by a model generation apparatus is provided. By executing the program on a computer, the above processing functions are realized on the computer. A program that describes processing content can be stored in a computer readable recording medium. Examples of the computer readable recording medium include a magnetic recorder, an optical disc, a magneto-optical recording medium, and a semiconductor memory. Examples of the magnetic recorder include a hard disc device (HDD), a flexible disc (FD), and a magnetic tape. Examples of the optical disc include a DVD (Digital Versatile Disc), a DVD-RAM (Random Access Memory), a CD-ROM (Compact Disc Read Only Memory), and a CD-R (Recordable)/RW (ReWritable). Examples of the magneto-optical recording medium include an MO (Magneto-Optical disk).

For distribution of a program, portable recording media such as DVD and CD-ROM in which the program is recorded are sold. The program can also be transferred from a server computer to other computers via a network by storing the program in a storage device of the server computer.

A computer to execute the program, for example, stored in a portable recording medium or transferred from a server computer stores the program in a storage device of the computer. Then, the computer reads the program from the storage device thereof to perform processing according to the program. Incidentally, the computer can also perform processing according to the program by directly reading the program from a portable recording medium. The computer can also perform processing successively according to a received program each time the program is transferred from a server computer.

The invention claimed is:

1. A model generation method processed in a current source noise model creating part of a power supply noise analysis apparatus, for generating a current source noise model applied in creating a semiconductor device model used for power supply noise analysis, comprising:
using the power supply noise analysis apparatus for:
calculating for each of a plurality of selected elements, which are arranged in a semiconductor device to be analyzed and change state leading to noise generation, a noise value representing a noise amount based on a current source noise waveform by determining the current source noise waveform calculated in accordance with a current flowing from a power supply when the state of the element changes;
acquiring timing when the change of state of the plurality of elements causing the current source noise occurs by a static timing analysis in a timing window having a predetermined time width;
calculating noise by unit time by dividing an analysis time in which a transient analysis is performed into unit times;
determining the total noise in each unit time by adding for each divided unit time the noise value calculated for all elements whose timing window is present in the unit time; and
generating the current source noise model based on the determination of the total noise.

2. The model generation method according to claim 1, wherein
the noise value is calculated from a peak value of the current source noise waveforms, a width of the current source noise waveforms in addition to the peak value, or a value of inclination of the current source noise waveforms.

3. The model generation method according to claim 1, wherein
the total amount of noise generated in each unit time is determined, and the unit times are organized in descending order based on the total noise in each unit time.

4. The model generation method according to claim 1, wherein
the total noise by unit time is calculated by creating a noise value table by unit time in which the element whose timing window is present and the noise by unit time are associated for each unit time, storing the noise value table in a storage unit, and determining the noise generation timing based on the noise value table by unit time stored in the storage unit.

5. The model generation method according to claim 1, wherein
the noise by unit time is calculated and the noise generation timing is determined for each divided area after dividing the semiconductor device into areas.

* * * * *